United States Patent
Noda et al.

(10) Patent No.: US 10,713,507 B2
(45) Date of Patent: Jul. 14, 2020

(54) OBJECT DETECTING APPARATUS, OBJECT DETECTING METHOD, AND COMPUTER PROGRAM PRODUCT

(71) Applicant: Kabushiki Kaisha Toshiba, Minato-ku (JP)

(72) Inventors: Reiko Noda, Kawasaki (JP); Tomoki Watanabe, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/911,607

(22) Filed: Mar. 5, 2018

(65) Prior Publication Data

US 2018/0373942 A1    Dec. 27, 2018

(30) Foreign Application Priority Data

Jun. 22, 2017  (JP) ................. 2017-122337

(51) Int. Cl.
| | |
|---|---|
| H04N 7/18 | (2006.01) |
| G06K 9/00 | (2006.01) |
| G06K 9/62 | (2006.01) |
| G06N 3/02 | (2006.01) |
| G08G 1/16 | (2006.01) |

(52) U.S. Cl.
CPC ....... *G06K 9/00805* (2013.01); *G06K 9/6273* (2013.01); *G06N 3/02* (2013.01); *G08G 1/166* (2013.01); *G06T 2207/30261* (2013.01)

(58) Field of Classification Search
CPC .......... G06K 9/00791; G06K 9/00805; G06K 9/6273; G06T 2207/30252; G06N 3/02
See application file for complete search history.

(56) References Cited

U.S. PATENT DOCUMENTS

| | | | |
|---|---|---|---|
| 2017/0300762 A1* | 10/2017 | Ishii | B60R 1/00 |
| 2018/0045519 A1* | 2/2018 | Ghadiok | G05D 1/0246 |
| 2018/0137644 A1* | 5/2018 | Rad | G06T 7/73 |
| 2018/0293466 A1* | 10/2018 | Viswanathan | G06N 3/08 |

(Continued)

FOREIGN PATENT DOCUMENTS

JP    4502733    7/2010

OTHER PUBLICATIONS

Watanabe, et all . "Co-occurrence Histograms of Oriented Gradients for Human Detection." Information and Media Technologies 5.2 (2010): 659-667. (Year: 2010).*

(Continued)

*Primary Examiner* — Fabio S Lima
(74) *Attorney, Agent, or Firm* — Oblon, McClelland, Maier & Neustadt, L.L.P.

(57) ABSTRACT

According to an embodiment, an object detecting apparatus includes a detecting unit and a non-linear processing unit. The detecting unit is configured to detect one or more object-candidate regions from a captured image. The non-linear processing unit is configured to input the entire captured image or a part of the captured image at least including the object-candidate region to a neural network having been trained to estimate the posture of an object in the object-candidate region and the distance to the object simultaneously, and output object information at least including information on the distance to the object, using an output from the neural network.

12 Claims, 10 Drawing Sheets

(56) References Cited

U.S. PATENT DOCUMENTS

2018/0308293 A1* 10/2018 DeCia .................. H04N 7/181
2018/0364717 A1* 12/2018 Douillard ............... G06T 7/187
2018/0365888 A1* 12/2018 Satzoda ................. G06T 7/70

OTHER PUBLICATIONS

Arsalan Mousavian, et al., "3D Bounding Box Estimation Using Deep Learning and Geometry," pp. 7074-7082.
Florian Chabot, et al., "Deep MANTA: A Coarse-to-fine Many-Task Network for joint 2D and 3D vehicle analysis from monocular image," 10 Pages.
Xiaozhi Chen, et al., "Monocular 3D Object Detection for Autonomous Driving," The IEEE Conference on Computer Vision and Pattern Recognition (CVPR), 2016, pp. 2147-2156.
Arsalan Mousavian et al, "3D Bounding Box Estimation Using Deep Learning and Geometry", arXiv,org, Cornell University Library, Dec. 1, 2016, arXiv:1612,00496v1, XP080736198, 9 pages.
Yaran Chen, et aL, "Multi-task Learning with Cartesian Product-Based Multi-objective Combination for Dangerous Object Detection", Medical Image Computing and Computer-Assisted Intervention (MICCI), 2015, 18th International Conference, Munich, Germany, Oct. 5-9, 2015; Proceedings; [Lecture Notes in Computer Science; Lect Notes Computer], Springer International Publishing, CH, XP047416964, 2017, Part I, LNCS 10261, pp. 28-35.

* cited by examiner

OBJECT DETECTING APPARATUS, OBJECT DETECTING METHOD, AND COMPUTER PROGRAM PRODUCT

CROSS-REFERENCE TO RELATED APPLICATIONS

This application is based upon and claims the benefit of priority from Japanese Patent Application No. 2017-122337, filed on Jun. 22, 2017; the entire contents of which are incorporated herein by reference.

FIELD

Embodiments described herein relate generally to an object detecting apparatus, an object detecting method, and a computer program product.

BACKGROUND

Conventionally, a technology has been available for detecting an object from a captured image captured with a monocular camera. Also, a technology has been known for estimating the distance to an object detected from a captured image, by giving some assumptions as constraints. Such conventional technologies are, however, incapable of estimating the distance to the object correctly when the assumptions do not apply.

DETAILED DESCRIPTION

According to an embodiment, an object detecting apparatus includes a detecting unit and a non-linear processing unit. The detecting unit is configured to detect one or more object-candidate regions from a captured image. The non-linear processing unit is configured to input the entire captured image or a part of the captured image at least including the object-candidate region to a neural network having been trained to estimate the posture of an object in the object-candidate region and the distance to the object simultaneously, and output object information at least including information on the distance to the object, using an output from the neural network.

An object detecting apparatus, an object detecting method, and a computer program product according to one embodiment will now be explained in detail with reference to the accompanying drawings. The object detecting apparatus according to the embodiment detects an object that is included in a captured area on the basis of a captured image captured with a monocular camera, and outputs object information at least including information on a distance to the detected object. Used in the explanation hereunder is an example in which the object detecting apparatus is provided onboard a vehicle. In such a configuration, examples of an object to be detected by the object detecting apparatus include obstacles, such as other vehicles (hereinafter, referred to as "another vehicle"), pedestrians, and two-wheeled vehicles including bicycles and motor cycles that are located near the own-vehicle, and objects installed on roadside such as traffic lights, traffic signs, telephone poles, and signboards that might obstruct driving of the vehicle on which the onboard object detecting apparatus is mounted (hereinafter, referred to as an "own-vehicle"). The object detecting apparatus acquires a captured image captured with a monocular camera mounted on the own-vehicle (hereinafter, referred to as an "onboard camera"), detects an obstacle included in a region captured by the onboard camera, and outputs the object information.

Figure 1:
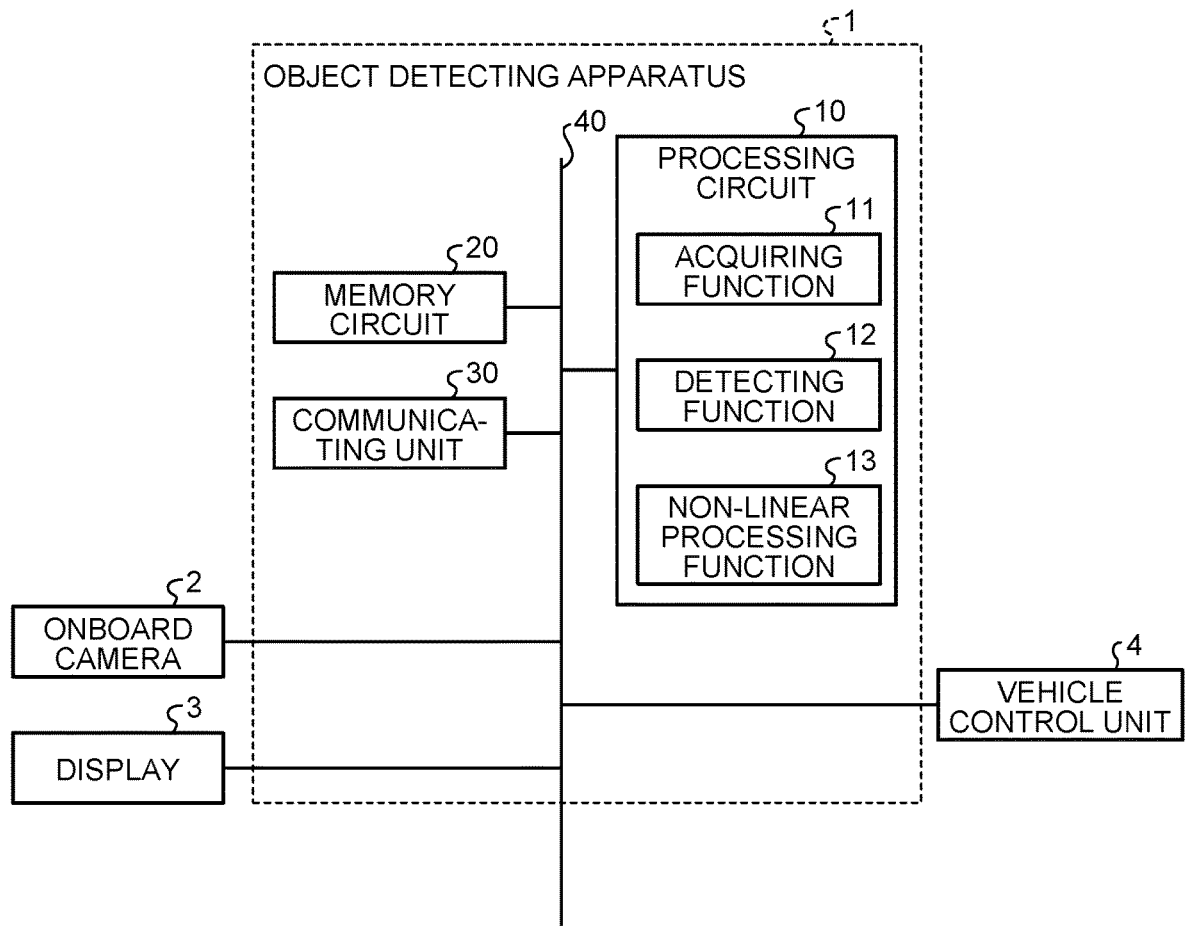
FIG. 1 is block diagram illustrating an exemplary configuration of an object detecting apparatus according to one embodiment.

FIG. 1 is a block diagram illustrating an exemplary configuration of such an object detecting apparatus 1 according to the embodiment. This object detecting apparatus 1 is configured as a dedicated or general-purpose computer, for example, and includes a processing circuit 10, a memory circuit 20, and a communicating unit 30, and a connect bus 40 connecting these units, as illustrated in FIG. 1. An onboard camera 2, a display 3, a vehicle control unit 4 are connected to the object detecting apparatus 1 in a wired or wireless manner.

The processing circuit 10 includes an acquiring function 11, a detecting function 12, and a non-linear processing function 13. Specifics of these processing functions will be described later. Illustrated in FIG. 1 are main processing functions relevant to the embodiment, but the processing functions included in the processing circuit 10 are not limited thereto.

The processing functions executed by the object detecting apparatus 1 are stored in the memory circuit 20 in the form of a compute-executable computer program, for example. The processing circuit 10 is a processor for implementing a processing function corresponding to a computer program, by reading the computer program from the memory circuit 20 and executing the computer program. The processing circuit 10 having read the computer programs obtains the functions illustrated in FIG. 1.

Illustrated in FIG. 1 is an example in which the processing functions including the acquiring function 11, the detecting function 12, the non-linear processing function 13 are implemented by one processing circuit 10, but the processing circuit 10 may be provided as a combination of a plurality of independent processors. In such a configuration, each of the processing functions may be configured as a computer program, or some specific function may be implemented as an independent dedicated circuit executing a computer program.

The "processor" mentioned above means a circuit examples of which include a general-purpose processor such as a central processing unit (CPU) and a graphical processing unit (GPU), an application specific integrated circuit (ASIC), and a programmable logic device (such as a simple programmable logic device (SPLD), a complex programmable logic device (CPLD), and a field programmable gate array (FPGA)). The processor implements a function by reading a computer program stored in the memory circuit 20 and executing the computer program. Instead of storing the computer program in the memory circuit 20, the computer program may also be incorporated into the processor circuit directly. In such a configuration, the processor implements the function by reading the computer program incorporated in the circuit, and executing the computer program.

The memory circuit 20 stores therein data accompanying the processing functions implemented by the processing circuit 10, as required. The memory circuit 20 according to the embodiment stores therein computer programs and data used in various processes. Examples of the memory circuit 20 include a random access memory (RAM), a semiconductor memory device such as a flash memory, a hard disk, and an optical disc. The memory circuit 20 may be substituted by a storage device external to the object detecting apparatus 1. The memory circuit 20 may also be a storage medium temporarily storing therein a computer program having been communicated and downloaded over a local area network (LAN) or the Internet. The number of the storage medium is not limited to one, and the storage medium may include a plurality of media.

The communicating unit 30 is an interface for inputting information to and outputting information from an external device that is connected in a wired or wireless manner. The communicating unit 30 may also perform the communication by establishing a connection to a network.

The onboard camera 2 is a small inexpensive monocular camera that is mounted on the front side of the own-vehicle, at a position near the center of the vehicle width, for example. The onboard camera 2 may be a camera capturing a monochromatic image, or a camera capturing a color image. The onboard camera 2 may be a visible-light camera or a camera capable of acquiring infrared information. The onboard camera 2 may also be mounted in a manner enabled to capture an image of the rear side or a lateral side of the own-vehicle.

The display 3 is a display device such as a liquid crystal display, and displays various types of information. In the embodiment, the display 3 can display, for example, an image drawing with the object detecting information output from the object detecting apparatus 1.

The vehicle control unit 4 controls the amount of acceleration, the amount of braking, and the steering angle in the own-vehicle. In the embodiment, the vehicle control unit 4 can control to avoid obstacles by estimating the behavior (relative movement) of the obstacles, positioned near the own-vehicle, with respect to the own-vehicle, using the object information output from the object detecting apparatus 1.

The processing functions included in the processing circuit 10 will now be explained. The acquiring function 11 acquires a captured image captured by the onboard camera 2. The acquiring function 11 acquires a captured image successively at an interval of N frames per second, for example, from the onboard camera 2, and outputs the acquired captured image to the detecting function 12 and the non-linear processing function 13, as appropriate. In the embodiment, the acquiring function 11 is configured to acquire the captured image from the onboard camera 2, because this embodiment assumes an application in which the object detecting apparatus 1 is provided onboard a vehicle. However, the acquiring function 11 may be configured to acquire the captured image from the most appropriate monocular camera depending on the application. For example, for monitoring applications, the acquiring function 11 may acquire the captured image from a monocular camera installed as a fixed-position camera in a building or on a telephone pole. The acquiring function 11 may also be configured to acquire the captured images from a monocular camera mounted on a headgear device capturing an image of the front side, a lateral side, or rear side of the wearer.

The detecting function 12 detects a region that is likely to include the object to be detected (hereinafter, referred to as an "object-candidate region") from a captured image captured by the onboard camera 2 and received from the acquiring function 11. The detecting function 12 generally detects a large number of object-candidate regions from one frame of a captured image, but may also be configured to detect one object-candidate region. The object to be detected may be any one of another vehicle, a pedestrian, a two-wheeled vehicle, and a roadside object, or a plurality of types of such objects may be detected simultaneously. A process performed by the detecting function 12 will be explained below, under the assumption that the object to be detected is another vehicle.

The detecting function 12 detects an object-candidate region on the basis of a determination as to whether the object to be detected is present, using a scanning rectangle having a size corresponding to the size of the object, in the captured image captured by the onboard camera 2. Other vehicles (vehicles), which are an example of the object to be detected, are on a road, and the sizes of other vehicles do not deviate very much from the size of a standard vehicle, although the degree of the deviation varies depending on the vehicle type. Therefore, the size of the scanning rectangle can be established on the basis of the size of the standard vehicle and the parameters of the onboard camera 2, corresponding to the position where the scanning rectangle is to be placed in the captured image.

Figure 2:
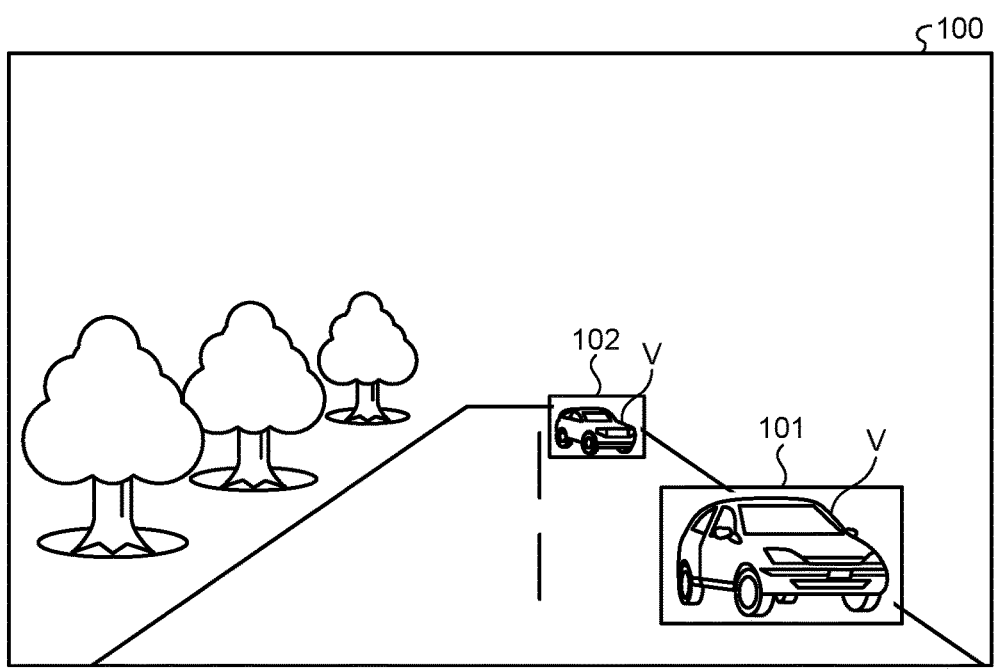
FIG. 2 is a schematic for explaining an exemplary process performed by a detecting function.

For example, as illustrated in FIG. 2, a scanning rectangle 101 that assumes the size of another vehicle V at a position near the onboard camera 2 is used at a position corresponding to a position near the onboard camera 2 in the captured image 100. A scanning rectangle 102 that assumes the size of another vehicle V at a position away from the onboard camera 2 is used at a position corresponding to a position away from the onboard camera 2 in the captured image 100. The detecting function 12 then calculates an image feature quantity, such as histograms of oriented gradients (HOG) or co-occurrence histograms of oriented gradients (CoHOG) value, for the image region inside of the scanning rectangle 101, 102, and either determines whether there is any other vehicle V in the scanning rectangle 101, 102 using a classifier having been trained in advance, or outputs likelihood indicating the likeliness of the image being another vehicle V. Examples of the image feature quantity are not limited to those listed herein, and any feature value calculated from an image may be used.

The detecting function 12 may also be configured to calculate an image feature quantity for the scanning rectangle, and to output likelihood of the image being another vehicle, using a neural network having been trained in advance, for example. Furthermore, the detecting function 12 may also be configured to input the image inside of the scanning rectangle directly to a neural network having been trained in advance, and to cause the neural network to output likelihood of the object being another vehicle. The detecting function 12 may also be configured to input the entire captured image or a part of the captured image captured by the onboard camera 2 to a neural network having been trained in advance, to obtain only the output of the position of the scanning rectangle, and to further subject the position to non-linear processing performed by a neural network or the like, and to cause the neural network to output likelihood of the object being another vehicle.

To detect a plurality of types of objects such as other vehicles and pedestrians, the number of variations in the shape or the size of the scanning rectangle may be increased, corresponding to the respective types of objects. Furthermore, even when the objects to be detected are only other vehicles, for example, the number of variations in the shape or the size of the scanning rectangle may be increased, examples of such variations including a scanning rectangle having a shape for detecting a vertically oriented other vehicle, and one having a shape for detecting a horizontally oriented other vehicle.

The detecting function 12 detects a region of the captured image in which the likelihood for the scanning rectangle is equal to or greater than a preset threshold as an object-candidate region, for example, and outputs candidate region information including information indicating the position of the object-candidate region in the captured image and the likelihood, to the non-linear processing function 13. Alternatively, the detecting function 12 may sort the regions of the captured image from those with the highest likelihood for the scanning rectangle, detect predetermined top N regions as object-candidate regions, and output the candidate region information thereof. Furthermore, for the regions of the captured image exhibiting high likelihood for the scanning rectangle, the detecting function 12 may put the regions exhibiting a predetermined amount or more of overlapping of rectangles into one group, and establish the top N regions exhibiting the highest likelihood, or the regions exhibiting likelihood equal to or greater than a certain threshold, as the object-candidate regions, and output candidate region information for such regions. This approach can be implemented using a technique referred to as non-maximum suppression (NMS). When the detecting function 12 groups the regions of the captured image, the detecting function 12 may group only the regions that can be considered to be substantially at the same distance from the onboard camera 2.

The non-linear processing function 13 performs non-linear processing to an image at least including the object-candidate region detected by the detecting function 12 (the entire captured image or a part of the captured image), and outputs object information at least including the information on the distance to the object in the object-candidate region. In the non-linear processing, a neural network that estimates the posture of the object and the distance to the object in the object-candidate region simultaneously is used, that is, a neural network trained to estimate the posture of the object and the distance to the object in the object-candidate simultaneously is used. In the embodiment, the "distance to the object" includes, not only the actual distance that is a value measured by a distance sensor such as a light detection and ranging (LIDAR) sensor, but also a value used for calculating the actual distance from a known value. For example, as will be described later, a value "a" equivalent to the difference between a distance that can be obtained from the position of the object-candidate region in the captured image captured by the onboard camera 2, and the actual distance to the object included in the object-candidate region is an example of the "distance to the object". The process performed by the non-linear processing function 13 will be generally explained below, under the assumption that the object to be detected is another vehicle, which is the same example as that used in the description of the detecting function 12.

To begin with, variations of the input to the neural network used in the non-linear processing will be explained. As an input, the entire captured image corresponding to one frame received from the acquiring function 11 at some point in time, or a part of the captured image may be input to the neural network. For example, for a captured image captured by the onboard camera 2 capturing the front side of the own-vehicle, the captured image with an upper region thereof trimmed may be input to the neural network, assuming that there are no other vehicles or pedestrians in the upper region. Furthermore, the non-linear processing function 13 may identify the position of the object-candidate region in the captured image on the basis of the candidate region information received from the detecting function 12, and input only the object-candidate region clipped from the captured image to the neural network.

Figure 3:
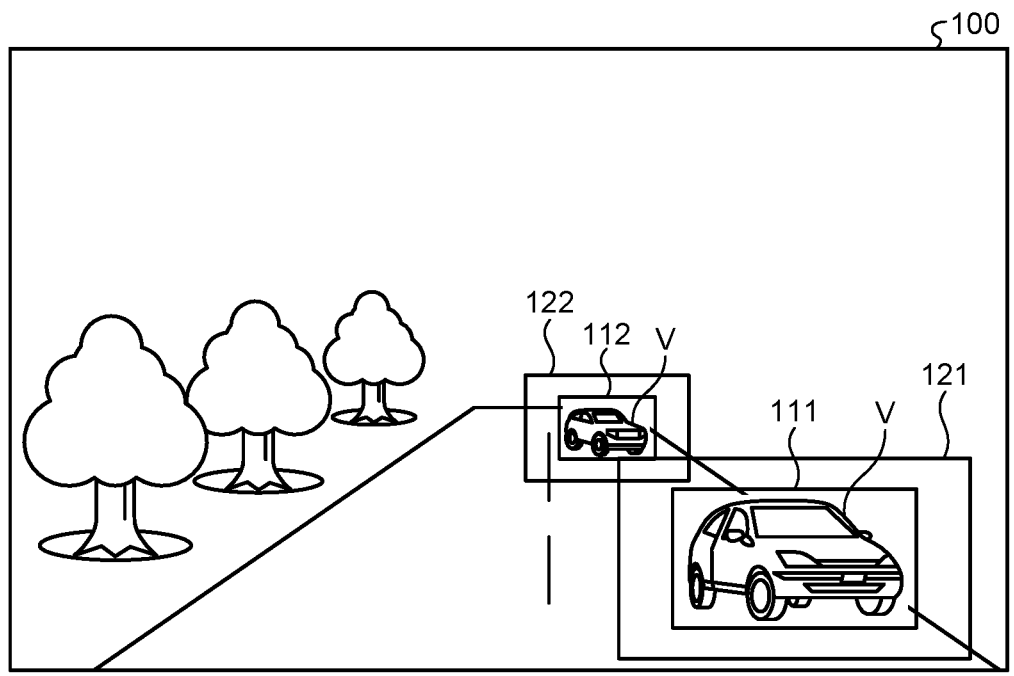
FIG. 3 is a schematic for explaining a variation of an input to a neural network.

The non-linear processing function 13 may also clip regions 121, 122, illustrated in FIG. 3, that are K times larger the respective object-candidate regions 111, 112 in the captured image 100, for the object-candidate regions 111, 112, and input the regions 121, 122 to the neural network. The regions 121, 122 may partly extend outside of the captured image 100. In such a case, the region outside of the captured image 100 may be filled with a pixel value corresponding to black, for example, or filled with pixel values at the corresponding end of the captured image 100. The ways in which the region outside of the captured image 100 is filled are not limited to those described herein, and may be filled in any other way.

The image data input to the neural network may also be an R, G, B color image, or an image resultant of a color space conversion, such as a Y, U, V color image. Furthermore, the image input to the neural network may be a one-channel image resultant of converting the color image into a monochromatic image. Furthermore, instead of inputting the image as it is, assuming an R, G, B color image, for example, the neural network may also receive an image from which an average pixel value in each channel is subtracted, or a normalized image from which an average value is subtracted and divided by a variance, as an input. Furthermore, a captured image corresponding to some point in time, or a part thereof may be also input to the neural network. It is also possible to input a captured image including a plurality of frames corresponding to several points in time with reference to one point in time, or a part of each captured image including a plurality of frames may be input to the neural network.

Variations of the non-linear processing performed by the neural network will now be explained. The neural network applies non-linear processing to the input image data to acquire a feature map for estimating the posture of the object and the distance to the object included in the object-candidate region detected from the captured image by the detecting function 12. The posture of the object and the distance to the object are then estimated using the acquired feature map, and the results are then output.

Figure 4:
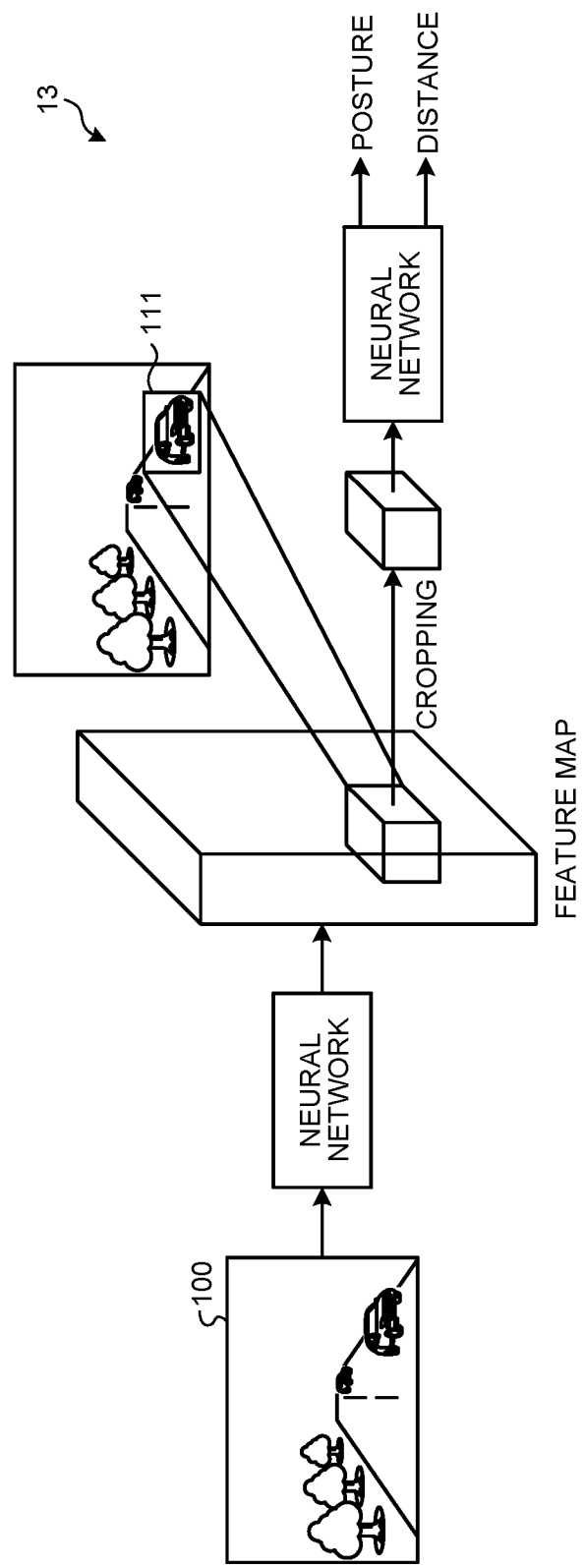
FIG. 4 is a schematic for explaining an exemplary process performed by a non-linear processing function.
Figure 5:
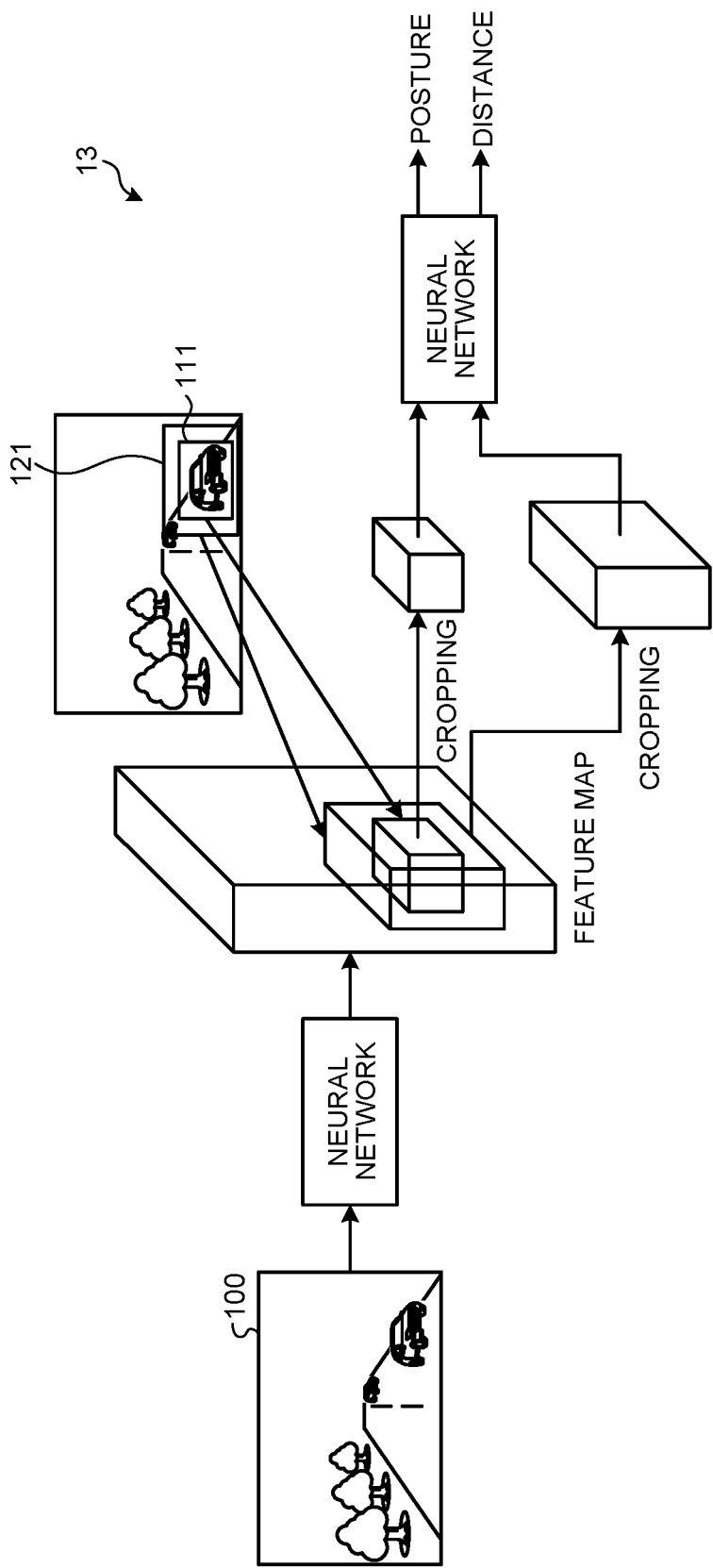
FIG. 5 is a schematic for explaining an exemplary process performed by the non-linear processing function.

When the entire captured image captured by the onboard camera 2 or the image resultant of trimming unnecessary portions of the entire captured image is input to the neural network, in addition to the image of the object-candidate region detected by the detecting function 12, the resultant feature map will be a feature map corresponding to such an image. In such a case, the non-linear processing function 13 crops the feature map corresponding to the object-candidate region 111 on the basis of the candidate region information received from the detecting function 12, as illustrated in FIG. 4, and uses the result in estimating the posture of the object and the distance to the object. The feature map can be cropped using a technique referred to as region-of-interest (ROI) pooling (Fast Region-based Convolutional Networks (R-CNN), Ross Girshick, ICCV2015), for example. At this time, the non-linear processing function 13 may crop not only the feature map corresponding to the object-candidate region 111, but also the feature map corresponding to the region 121 that is K times larger than the object-candidate region 111, as illustrated in FIG. 5, and use any one or both of these feature maps for estimating the posture of the object and the distance to the object, for example.

Figure 6:
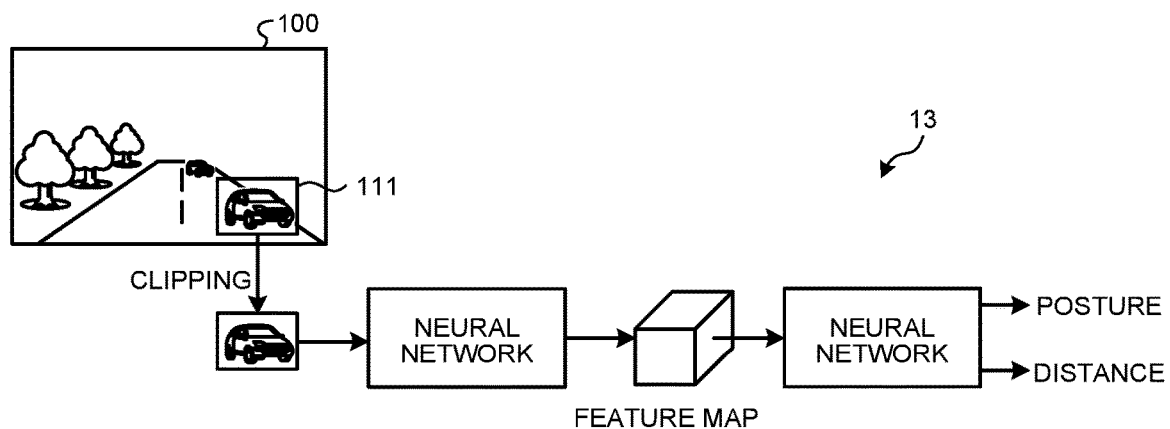
FIG. 6 is a schematic for explaining an exemplary process performed by the non-linear processing function.
Figure 7:
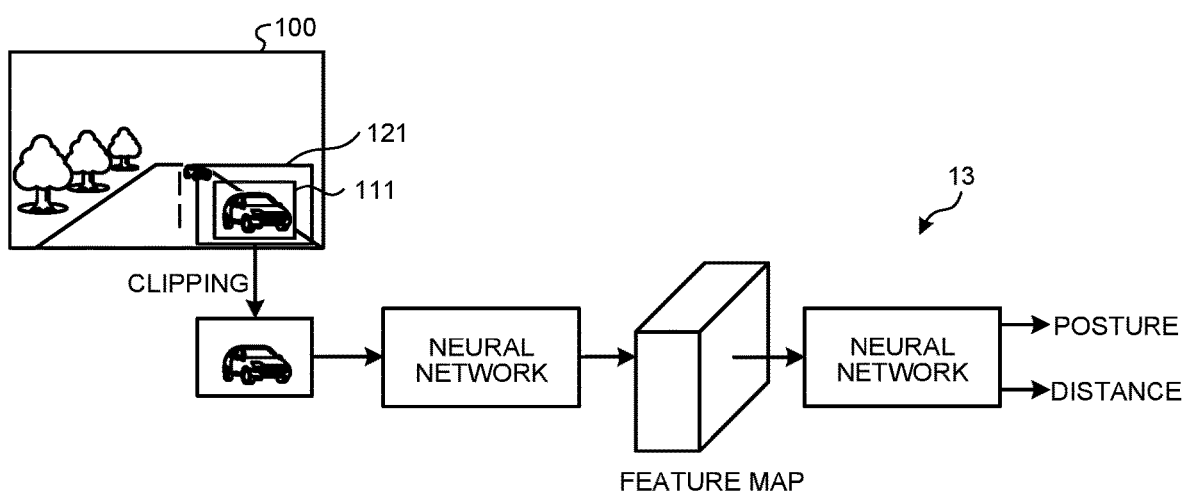
FIG. 7 is a schematic for explaining an exemplary process performed by the non-linear processing function.
Figure 8:
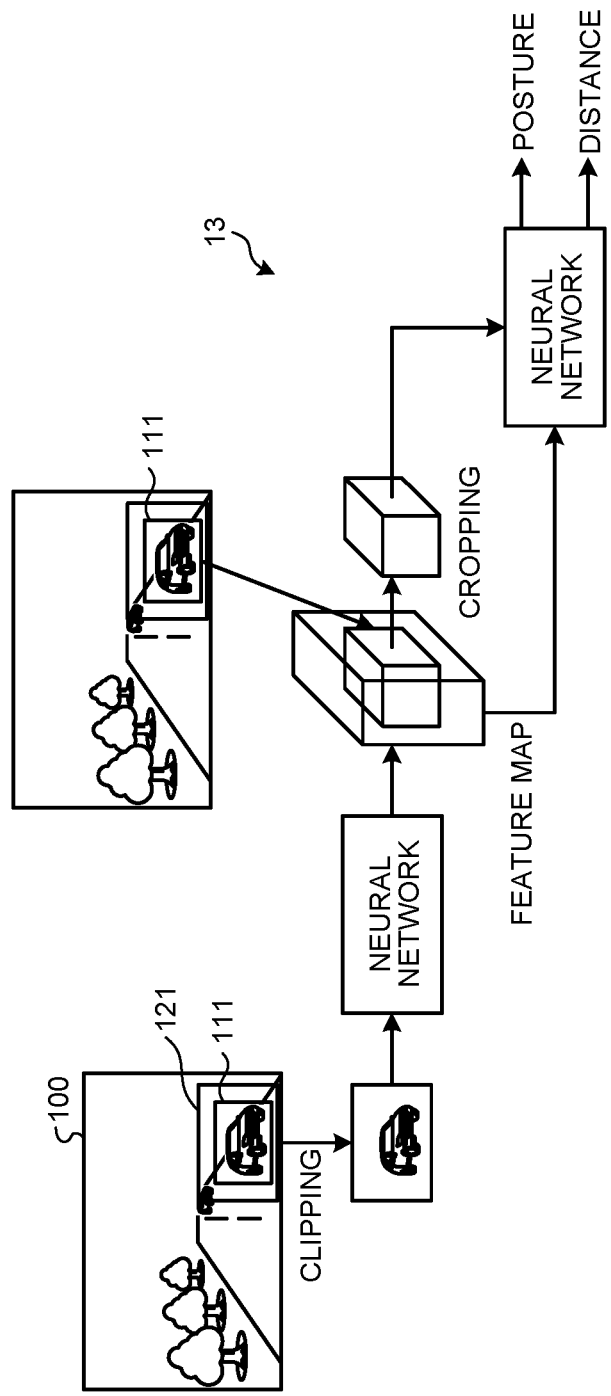
FIG. 8 is a schematic for explaining an exemplary process performed by the non-linear processing function.

When the clipped image corresponding to the object-candidate region 111 detected by the detecting function 12 and clipped from the captured image 100 captured by the onboard camera 2 is input to the neural network, as illustrated in FIG. 6, for example, a feature map corresponding to the object-candidate region 111 is acquired. Therefore, in such a case, the acquired feature map can be used for estimating the posture of the object and the distance to the object as it is. When the clipped image of the region 121 that is K times larger than object-candidate region 111 is input to the neural network, as illustrated in FIG. 7, for example, the feature map corresponding to the region 121 is acquired. In this case, the feature map corresponding to the region 121 may be used for estimating the posture of the object and the distance to the object as it is, or a feature map corresponding to the object-candidate region 111 may be cropped from the feature map corresponding to the region 121, as illustrated in FIG. 8, for example, and any one or both of the feature maps corresponding to the region 121 and the object-candidate region 111 may be used for estimating the posture of the object and the distance to the object.

Variations of the output from the neural network will now be explained. Examples of the output from the neural network include the posture of the object and the distance to the object included in the object-candidate region, for example.

Figure 9:
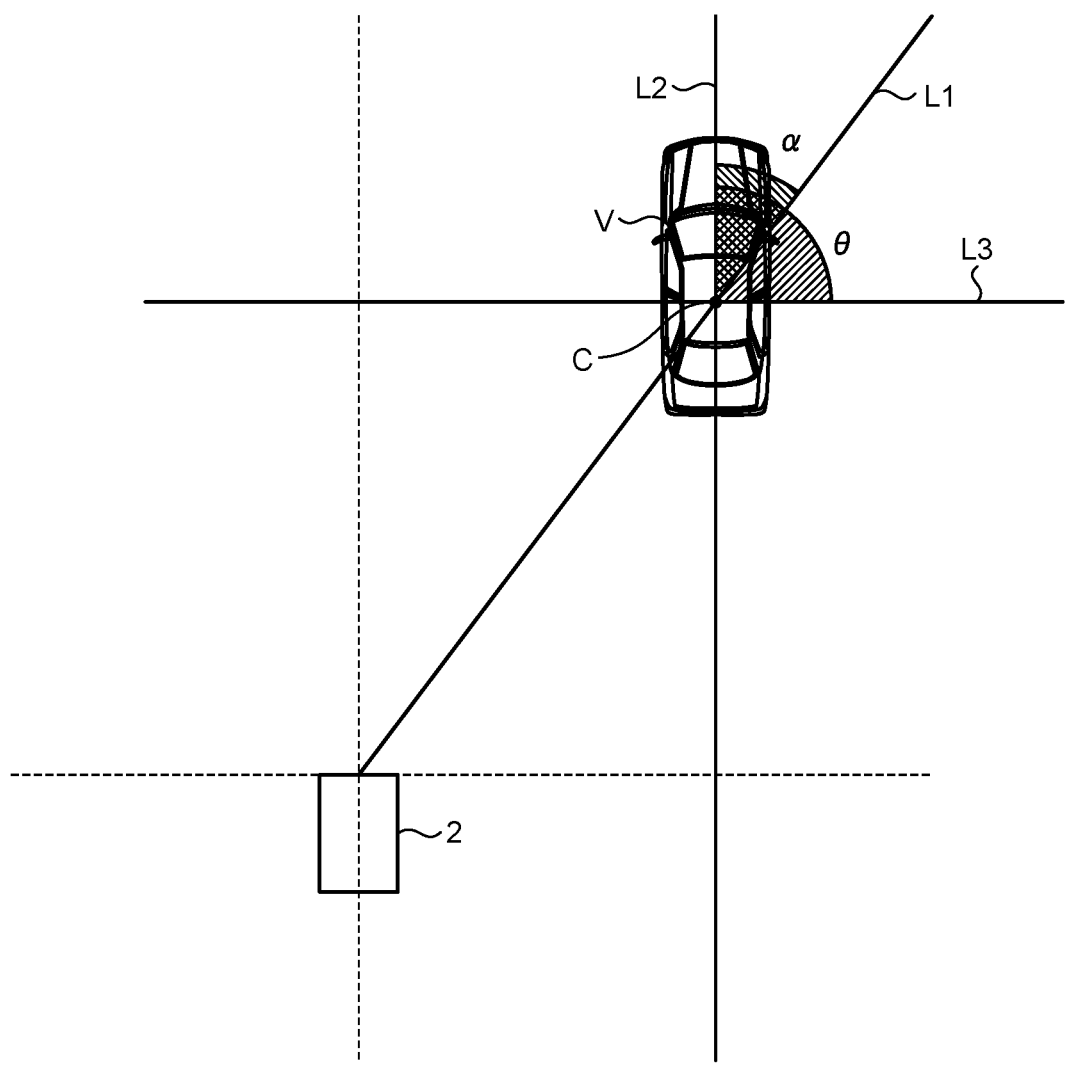
FIG. 9 is a schematic for explaining an example of the posture of another vehicle estimated by the neural network.

Illustrated in FIG. 9 is a bird's-eye view of the onboard camera 2 mounted so as to capture an image of the travelling direction of the own-vehicle, and the other vehicle V included in the captured area. As illustrated in FIG. 9, the neural network may be used to estimate an angle (orientation) α formed by a straight line L1 extending from the onboard camera 2 and passing through the center of balance C of the other vehicle V, and a straight line L2 extending from the center of balance C of the other vehicle V along the travelling direction of the other vehicle V, as the posture of the other vehicle V. The neural network may also be used to estimate an angle θ formed by a straight line L3 intersecting perpendicularly with the optical axis of the onboard camera 2, and the straight line L2 extending from the center of balance C of the other vehicle V along the travelling direction of the other vehicle V, as the posture of the other vehicle V, and to output the estimation.

Figure 10:
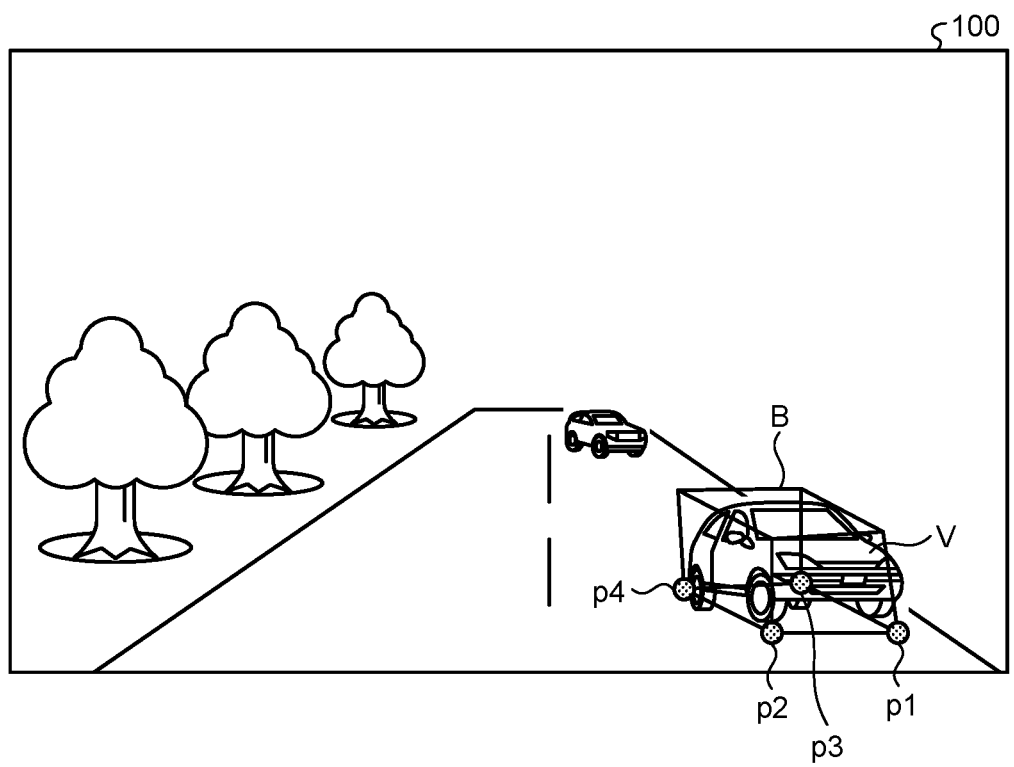
FIG. 10 is a schematic for explaining an example of the posture of the other vehicle estimated by the neural network.

Furthermore, among the four vertices p1, p2, p3, p4 of a surface (rectangle) of a cuboid B that circumscribes the other vehicle V, the surface being one that is in contact with the road surface in the captured image 100 captured by the onboard camera 2, as illustrated in FIG. 10, for example, the neural network may acquire the positions of at least two vertices that are visible from the own-vehicle in the captured image 100 for estimating the posture of the other vehicle V, and output the estimation.

As to the distance to the other vehicle, the neural network may be caused to estimate and to output the actual distance to the other vehicle (the distance measured with a distance sensor such as a LIDAR sensor), or caused to estimate and to output a value used for calculating the actual distance from a known value. An example of such a value used for calculating the actual distance from a known value includes a value "a" equivalent to the difference between a distance Z1 obtained from the position of the object-candidate region in the captured image captured by the onboard camera 2, and an actual distance Zr to the other vehicle. In such a case, the neural network is trained in advance to regress to the value "a" satisfying the following Equation (1), for example. The actual distance Zr to the other vehicle can then be calculated by substituting the distance Z1 obtained from the position of the object-candidate region in the captured image captured by the onboard camera 2, and the value "a" output from the neural network, for the respective variables in Equation (1) below.

$$Zr = Z1 \times a + Z1 \tag{1}$$

The value used for calculating the actual distance Zr from a known value is not limited to the value "a" that is equivalent to the above-mentioned difference.

The neural network may also output a value for correcting the object-candidate region detected by the detecting function 12 to a more accurate object-candidate region surrounded by another rectangle precisely circumscribing the other vehicle included in the object-candidate region, as an additional output. Furthermore, the neural network used by the non-linear processing function 13 may output likelihood indicating whether the object-candidate region includes any other vehicle, as an additional output.

The neural network used by the non-linear processing function 13 is trained in such a manner that a loss calculated from correct answer data and the output from the neural network is reduced, in a manner suitable for the variations of the input and the output explained above. The correct answer data is given to the neural network in advance, corresponding to the input image and the object-candidate region. The correct answer data herein is a piece of data including a label of the object included in the object-candidate region, information indicating the rectangle precisely circumscribing the object, the posture of the object, and the distance to the object, for example. As the label of the object, with a neural network configured to detect only other vehicles, and intended to estimate the posture of and the distance to another vehicle, for example, "1" may be assigned as a label when the rectangle circumscribing the other vehicle, exhibiting the highest overlap ratio with the object-candidate region, exhibits an overlap ratio equal to or greater than a certain threshold with respect to the rectangle indicating the object-candidate region, and "0" may be assigned when not.

As to the posture of the object, if there is any other vehicle exhibiting an overlap ratio equal to or higher than the certain threshold with respect to the object-candidate region, the angle α of the other vehicle, as illustrated in FIG. 9, may be measured using information on a group of points that are measured by a distance sensor, such as a LIDAR sensor, at the same time as when the training images are captured, for example, and the angle may be given as the correct answer. The positions of the four vertices p1, p2, p3, p4 of the surface of the cuboid B circumscribing the other vehicle V and being in contact with the road surface, as illustrated in FIG. 10, in the captured image 100 may also be given as the correct answer of the posture of the other vehicle V. In such a case, the vertices that are invisible depending on the orientation may not be set as the correct answer.

In the same manner, as to the distance to the object, the distance to the other vehicle, measured with the distance sensor, such as a LIDAR sensor, at the same time as when the training images are captured, may be used as the correct answer data, for example. Alternatively, the value corresponding to the error in the distance obtained from the position of the object-candidate region in the captured image captured by the onboard camera 2, with respect to the distance measured with a distance sensor such as a LIDAR sensor, that is, the value "a" indicated in Equation (1), may be used as the correct answer data.

As described above, by using a neural network trained in advance to estimate the posture of the object and the distance to the object simultaneously, the non-linear processing function 13 according to the embodiment can estimate the distance to the object correctly regardless of the posture of the object. The loss in the label of the object can be defined as a cross entropy error, and the losses in the circumscribing rectangle, the posture, and the distance can be defined with a square error or smooth L1 error, for example. The loss in the entire neural network can be calculated by calculating the sum of the losses in the object label, the circumscribing rectangle, the posture, the distance, and the like. Therefore, the neural network can be trained in a manner to minimize each of the losses while sharing the weight of the neural network through error propagation, for example.

Furthermore, different neural networks may be trained in advance, for the process from receiving an input of an image to acquiring a feature map, and the process from estimating the posture of the object and the distance to the object from the feature map and to outputting the result, or one neural network may be trained in advance for the entire process from receiving an input of the image to outputting the posture of the object and the distance to the object. Furthermore, in a configuration in which the detecting function 12 uses a neural network to detect the object-candidate region, the neural network used by the detecting function 12 and the neural network used by the non-linear processing function 13 may be trained in advance as one network.

When a plurality of types of objects (e.g., other vehicles and pedestrians) are to be detected simultaneously, different neural networks may be trained and used for the respective object types to be detected, or the same neural network may be trained and used. Even when the object to be detected is limited to other vehicles, different neural networks may be trained for respective vehicle types, such as passenger cars, trucks, and buses, and such neural networks may be used in the estimations of the posture or the distance, and the non-linear processing function 13 may output the result with the highest likelihood as an output, for example.

When the neural network is configured to additionally output a value for correcting the object-candidate region and a likelihood indicating the likeliness of being the object in the manner described above, and a large number of object-candidate regions are detected from a captured image corresponding to one frame, the non-linear processing function 13 may put the object-candidate regions exhibiting a certain overlap into one group on the basis of the likelihood indicating the likeliness of being the object and the information on the corrected object-candidate region, both of which are output from the neural network, and output only the estimation results for the top N object-candidate regions with the highest likelihood, or the estimation results for the object-candidate regions with likelihood equal to or greater than a certain threshold. This approach can be implemented using the technique referred to as NMS mentioned above, for example.

The non-linear processing function 13 may output information on the posture of the object and the distance to the object as received from the neural network as the object information, or process the output from the neural network before outputting the result as the object information. For example, when the neural network outputs the value "a" indicating the relative distance (the value equivalent to the difference between the distance Z1 and the distance Zr) as the distance information, the non-linear processing function 13 may obtain the distance Z1 from the camera parameters of the onboard camera 2 and the position of the object-candidate region in the captured image, calculate the actual distance Zr using the distance Z1 and the value "a" output from the neural network, and output object information including the actual distance Zr.

Furthermore, the non-linear processing function 13 may also calculate three-dimensional position and the orientation of the object using the posture and the distance information output from the neural network, and output object information including the three-dimensional position and the orientation of the object. For example, when another vehicle is to be detected from a captured image captured by the onboard camera 2 mounted so as to capture an image of the travelling direction of the own-vehicle, the non-linear processing function 13 may calculate in which position the other vehicle is located with respect to the own-vehicle using the posture and distance information output from the neural network, and output the three-dimensional position of the other vehicle and the orientation of the other vehicle with respect to the own-vehicle, as the object information. When the non-linear processing function 13 can acquire the coordinates (x1, y1) of the upper left vertex and the coordinates (x2, y2) of the lower right vertex of the circumscribing rectangle surrounding the other vehicle in the captured image, the actual distance Zr to the other vehicle, and the orientation α of the other vehicle (see FIG. 9) from the output from the neural network for the non-linear processing function 13, for example, given these values and the parameter matrix of the onboard camera 2, the non-linear processing function 13 can obtain the three-dimensional position of the other vehicle and the orientation of the other vehicle in the top view using a known technique. The non-linear processing function 13 may also be configured to use the object posture information output from the neural network only in calculating the three-dimensional position, and to output object information not including the posture (orientation) information.

The vehicle control unit 4 connected to the object detecting apparatus 1 according to the embodiment can use the object information output from the non-linear processing function 13, to perform the vehicle control of the own-vehicle, for example. The vehicle control unit 4 includes a collision avoidance system, an automatic braking system, an adaptive cruise control system, and an automatic operation control system, for example. Using the object information output in units of one frame of a captured image captured by the onboard camera 2, for example, the collision avoidance system can estimate a trajectory representing the movement of the other vehicle with respect to the own-vehicle, and calculate the probability of the own-vehicle colliding with the other vehicle in m seconds. The vehicle control unit 4 can then use the result to determine whether to activate the automatic braking system or not. Furthermore, using the object information output in units of one frame of a captured image captured by the onboard camera 2, the adaptive cruise control system can control to keep the own-vehicle inside the lanes in which the own-vehicle is running while avoiding obstacles, and to ensure a clearance equal to or more than a predetermined distance with respect to the other vehicle running ahead of the own-vehicle. Using the object information output in units of one frame of a captured image captured by the onboard camera 2, the automatic operation control system can calculate a travel path for avoiding obstacles, and control the own-vehicle to travel the travel path autonomously.

Figure 11:
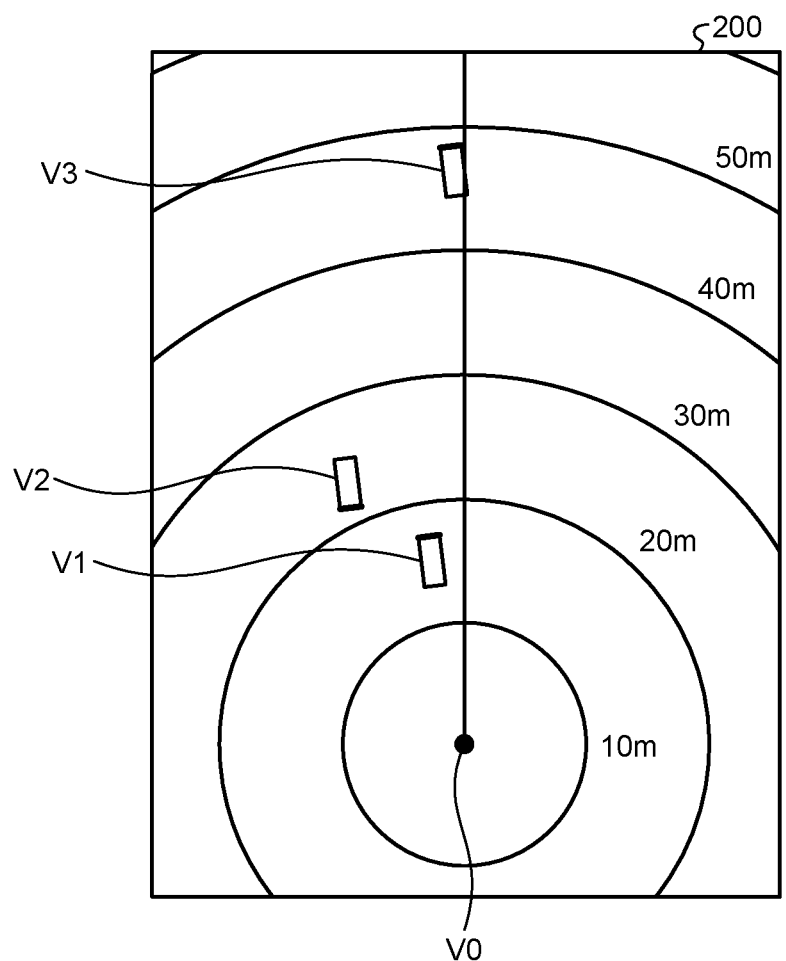
FIG. 11 is a schematic illustrating an example of an image to be displayed on a display.

Furthermore, for example, the object information output from the non-linear processing function 13 may be used to display obstacle information onto the display 3 that is connected to the object detecting apparatus 1 according to the embodiment. For example, as illustrated in FIG. 11, an image 200 indicating the positions and the posture of the other vehicles V1, V2, V3 with respect to the own-vehicle V0 can be drawn and displayed on the display 3 on the basis of the object information output from the non-linear processing function 13. In the example of an image illustrated in FIG. 11, using the position of the own-vehicle V0 as a reference, the distances to the other vehicles V1, V2, V3 are indicated by the positions where the rectangles representing the respective other vehicles V1, V2, V3 are drawn, and the posture of the other vehicles V1, V2, V3 are indicated by the angles at which the rectangles are drawn. The side of the rectangles drawn with a thick line indicates the front side of the other vehicles V1, V2, V3 (travelling direction).

Figure 12:
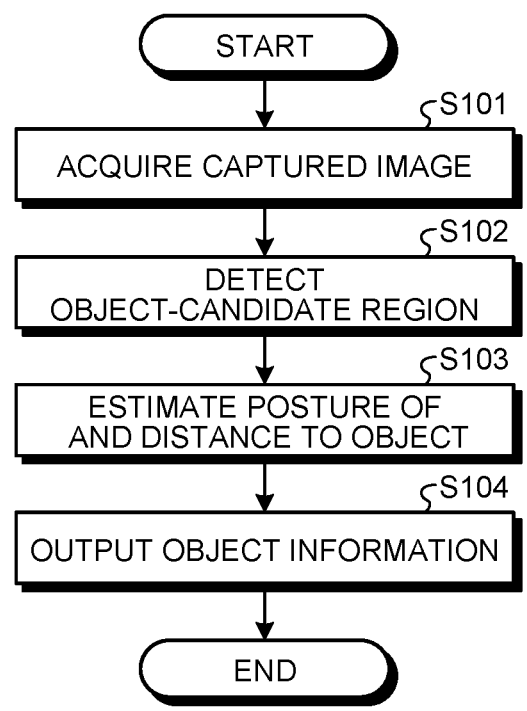
FIG. 12 is a flowchart illustrating an exemplary operation of the object detecting apparatus according to the embodiment.

FIG. 12 is a flowchart illustrating an exemplary operation of the object detecting apparatus 1 (the processing circuit 10) according to the embodiment explained above. Because the specific details of each step included in FIG. 12 has been described above, detailed explanation thereof will be omitted as appropriate.

To begin with, the acquiring function 11 of the processing circuit 10 acquires a captured image captured by the onboard camera 2 (monocular camera) (Step S101). The detecting function 12 in the processing circuit 10 then detects at least one object-candidate region from the captured image acquired at Step S101 (Step S102). The non-linear processing function 13 of the processing circuit 10 then estimates the posture of the object and the distance to the object in the object-candidate region on the basis of the captured image acquired at Step S101 and the candidate region information indicating the object-candidate region detected at Step S102 (Step S103). At this time, the non-linear processing function 13 estimates the posture of the object and the distance to the object in the object-candidate region using a neural network trained to estimate the posture of the object and the distance to the object in the object-candidate region, simultaneously. The non-linear processing function 13 then outputs the object information at least including the information on the distance to the object (Step S104).

As explained above, the object detecting apparatus 1 according to the embodiment detects an object-candidate region from a captured image captured by the onboard camera 2 (monocular camera), and estimates the distance to the object in the object-candidate region using a neural network trained to estimate the posture of the object and the distance to the object, simultaneously. Therefore, with the object detecting apparatus 1 according to the embodiment, the distance to the object can be estimated highly accurately using an image captured by the onboard camera 2 (monocular camera).

When the object to be detected is another vehicle, for example, the object detecting apparatus 1 according to the embodiment estimates the posture of another vehicle and the distance to the other vehicle captured in the captured image captured by the onboard camera 2 directly, using a neural network. Therefore, the position or the orientation of another vehicle located ahead of the own-vehicle in the driving lane can be estimated accurately, regardless of the shape of the road surface, for example, and such an estimation can be used in collision avoidance, automatic braking, and travel-path generation, for example.

Furthermore, by configuring the object detecting apparatus 1 according to the embodiment to estimate the value "a" equivalent to the difference between the distance Z1 obtained from the position of the object-candidate region in the captured image captured by the onboard camera 2, and the actual distance Zr to the object, as the distance to the object using a neural network, the neural network can be trained appropriately without depending on the camera parameters, and the distance to the object can be estimated highly accurately in the actual use.

The processing functions of the object detecting apparatus 1 according to the embodiment can be implemented by causing the object detecting apparatus 1 that is configured as a computer, as mentioned above, to execute a computer program, for example. In such a case, the computer program executed by the object detecting apparatus 1 according to the embodiment may be stored in a computer connected to a network such as the Internet, and made available for downloading over the network. Furthermore, the computer program executed by the object detecting apparatus 1 according to the embodiment may also be provided or distributed over a network such as the Internet. Furthermore, the computer program executed by the object detecting apparatus 1 according to the embodiment may be provided in a manner incorporated in a nonvolatile recording medium such as a read-only memory (ROM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object detecting apparatus comprising:
one or more processors configured to:
detect one or more object-candidate regions from a captured image captured by an onboard camera;
input the entire captured image or a part of the captured image at least including the object-candidate region to a single neural network trained to estimate a posture of and a distance to an object in the object-candidate region simultaneously; and
output object information at least including information on the distance to the object, using an output from the neural network, wherein
the distance to the object estimated by the neural network is a value equivalent to a difference between a distance obtained from a position of the object-candidate region relative to the onboard camera in the captured image and a first actual distance to the object, the first actual distance being measured with a distance sensor, and the neural network is trained in advance to regress to a value a that satisfies an equation Zr=Zl×a+Zl, where the value a represents the value equivalent to the difference, the value Zl represents the distance obtained from a position of the object-candidate region, and the value Zr represents the first actual distance.

2. The apparatus according to claim 1, wherein
the one or more processors
calculate a distance Zr as a second actual distance to the object, the distance Zr being obtained by substituting, for the distance Zl and the value a in the equation, the distance obtained from a position of the object-candidate region and the value equivalent to the difference estimated by the neural network, respectively, and
output object information including the second actual distance to the object.

3. The apparatus according to claim 1, wherein
the one or more processors output object information including information on the distance to the object and information indicating the posture of the object.

4. The apparatus according to claim 1, wherein
the one or more processors detect the object-candidate region from the captured image, using a co-occurrence histograms of oriented gradients (CoHOG) feature.

5. The apparatus according to claim 1, wherein
the one or more processors detect the object-candidate region using a neural network receiving an input of the captured image and outputting the object-candidate region.

6. The apparatus according to claim 1, wherein
the captured image is an image captured by an onboard camera, and
the object is at least one of a vehicle, a pedestrian, a two-wheeled vehicle, and a roadside object.

7. The apparatus according to claim 6, wherein
the onboard camera is a monocular camera.

8. The apparatus according to claim 6, wherein the one or more processors are further configured to control a vehicle including the onboard camera, based on the object information.

9. An object detecting method comprising:
detecting one or more object-candidate regions from a captured image captured by an onboard camera;
inputting the entire captured image or a part of the captured image at least including the object-candidate region to a single neural network trained to estimate a posture of and a distance to an object in the object-candidate region simultaneously; and
outputting object information at least including information on the distance to the object, using an output from the neural network, wherein
the distance to the object estimated by the neural network is a value equivalent to a difference between a distance obtained from a position of the object-candidate region relative to the onboard camera in the captured image and a first actual distance to the object, the first actual distance being measured with a distance sensor, and the neural network is trained in advance to regress to a value a that satisfies an equation Zr=Zl×a+Zl, where the value a represents the value equivalent to the difference, the value Zl represents the distance obtained from a position of the object-candidate region, and the value Zr represents the first actual distance.

10. The method according to claim 9, further comprising:
calculating a distance Zr as a second actual distance to the object, the distance Zr being obtained by substituting, for the distance Zl and the value a in the equation, the distance obtained from a position of the object-candidate region and the value equivalent to the difference estimated by the neural network, respectively, and
outputting object information including the second actual distance to the object.

11. A computer program product stored on a non-transitory computer readable medium including instructions which, when executed by a computer, cause the computer to perform:
detecting one or more object-candidate regions from a captured image captured by an onboard camera;
inputting the entire captured image or a part of the captured image at least including the object-candidate region to a single neural network trained to estimate a posture of and a distance to an object in the object-candidate region simultaneously; and
outputting object information at least including information on the distance to the object, using an output from the neural network, wherein
the distance to the object estimated by the neural network is a value equivalent to a difference between a distance obtained from a position of the object-candidate region relative to the onboard camera in the captured image and a first actual distance to the object, the first actual distance being measured with a distance sensor, and the neural network is trained in advance to regress to a value a that satisfies an equation Zr=Zl×a+Zl, where the value a represents the value equivalent to the difference, the value Zl represents the distance obtained from a position of the object-candidate region, and the value Zr represents the first actual distance.

12. The computer program product according to claim 11, wherein the instructions cause the computer to further perform:
calculating a distance Zr as a second actual distance to the object, the distance Zr being obtained by substituting, for the distance Zl and the value a in the equation, the distance obtained from a position of the object-candidate region and the value equivalent to the difference estimated by the neural network, respectively, and
outputting object information including the second actual distance to the object.

* * * * *